(12) United States Patent
Gutman et al.

(10) Patent No.: US 7,366,930 B2
(45) Date of Patent: Apr. 29, 2008

(54) SYSTEM AND METHOD FOR SUCCESSFULLY NEGOTIATING A SLOWEST COMMON LINK SPEED BETWEEN A FIRST AND SECOND DEVICE

(75) Inventors: Michael Gutman, Zichron-Yaacov (IL); Avi Costo, Haifa (IL); Yaniv Hadar, Yahud (IL)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 10/321,132

(22) Filed: Dec. 17, 2002

(65) Prior Publication Data

US 2004/0117674 A1 Jun. 17, 2004

(51) Int. Cl.
*G06F 1/32* (2006.01)
*G06F 5/06* (2006.01)

(52) U.S. Cl. ............... 713/320; 713/300; 713/600; 709/220; 709/227; 709/230; 709/248

(58) Field of Classification Search ........... 713/300, 713/320; 709/220, 221, 227, 230, 248
See application file for complete search history.

(56) References Cited

U.S. PATENT DOCUMENTS

| 2004/0003296 A1* | 1/2004 | Robert et al. | 713/300 |
| 2004/0088590 A1* | 5/2004 | Lee et al. | 713/300 |
| 2005/0165959 A1* | 7/2005 | Huff | 709/238 |

* cited by examiner

*Primary Examiner*—Mark Connolly
(74) *Attorney, Agent, or Firm*—Buckley, Maschoff & Talwalkar LLC

(57) ABSTRACT

According to some embodiments, an Ethernet link speed is determined based on a power-related configuration, and an Ethernet link is negotiated at the link speed. Embodiments may also include determination of whether a power-conserving protocol is enabled, and/or may be implemented by an Ethernet controller.

9 Claims, 5 Drawing Sheets

| SUPPORTED LINK SPEEDS 51 | PROTOCOL FLAG 52 | INITIAL LINK SPEED 53 | PREFERRED COMMON LINK SPEED 54 |
|---|---|---|---|
| 10Mbps, 100Mbps, 1Gbps | OFF | 100Mbps | 1Gbps |

FIG. 4

SYSTEM AND METHOD FOR SUCCESSFULLY NEGOTIATING A SLOWEST COMMON LINK SPEED BETWEEN A FIRST AND SECOND DEVICE

BACKGROUND

Power consumption is a substantial factor in the design of most electronic systems. Generally, a system that consumes a small amount of power will generate less heat than a system that consumes a large amount of power. High-power systems therefore require more robust heat dissipation techniques than low-power systems. Such a technique often increases the cost and complexity of the system in which it is used, while also decreasing the efficiency of the system.

Power consumption is of particular concern in locally-powered systems such as battery-powered laptop or handheld computing devices. The functionality of these devices relies greatly on their ability to function for extended periods using a single mobile power source. Consequently, a decrease in the power consumption of these devices leads to a direct increase in their functionality.

According to current Ethernet protocols under the Institute of Electrical and Electronics Engineers (IEEE) 802.3 standard, two communicating devices may occasionally transition between "link connect" and "link disconnect" states. When re-connecting, the devices establish an Ethernet link at a highest link speed supported by each device. However, since power consumption increases with link speed, the power consumption resulting from these protocols is often unacceptable.

BRIEF DESCRIPTION OF THE DRAWINGS

FIG. 4 is a tabular representation of configuration information used in conjunction with some embodiments.

DETAILED DESCRIPTION

Figure 1:
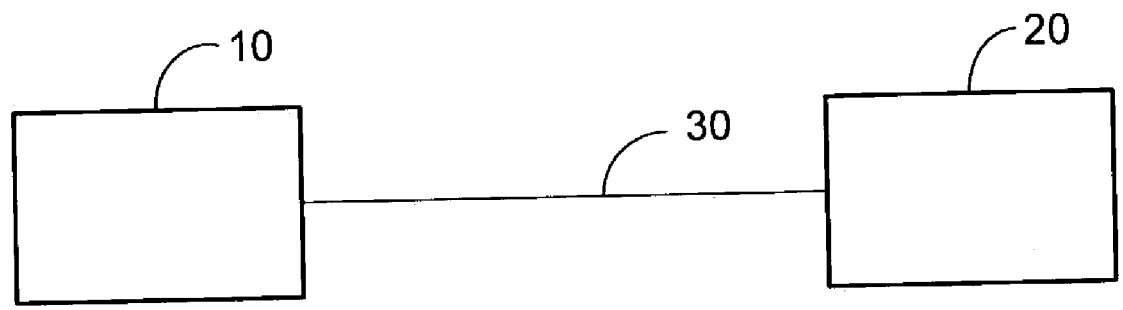
FIG. 1 is a diagram of a system according to some embodiments.

FIG. 1 is a diagram illustrating two devices in communication according to some embodiments. Device 10 and device 20 may each comprise any device or devices capable of communicating via an Ethernet protocol over physical link 30. Such devices include but are not limited to Ethernet controllers, motherboards, expansion cards, line cards, personal computers, personal digital assistants, cellular telephones, kiosks, hubs and switches.

In some embodiments, device 10 determines an Ethernet link speed based on a power-related configuration, and negotiates an Ethernet link with device 20 at the determined link speed. Contrary to conventional Ethernet protocols, the link speed may be slower than another link speed that is supported by both device 10 and device 20. Details of this operation according to several specific embodiments will be described below with respect to FIG. 2.

Although physical link 30 is illustrated as a direct connection, any number of physical elements may reside between device 10 and device 20. More specifically, link 30 may comprise one or more of any number of different systems for transferring data via an Ethernet protocol, including a Local Area Network (LAN) and a Metropolitan Area Network (MAN). Moreover, physical link 30 may comprise one or more of any readable medium for transferring data, including coaxial cable, twisted-pair wires, fiber-optics, RF, infrared and the like.

Figure 2:
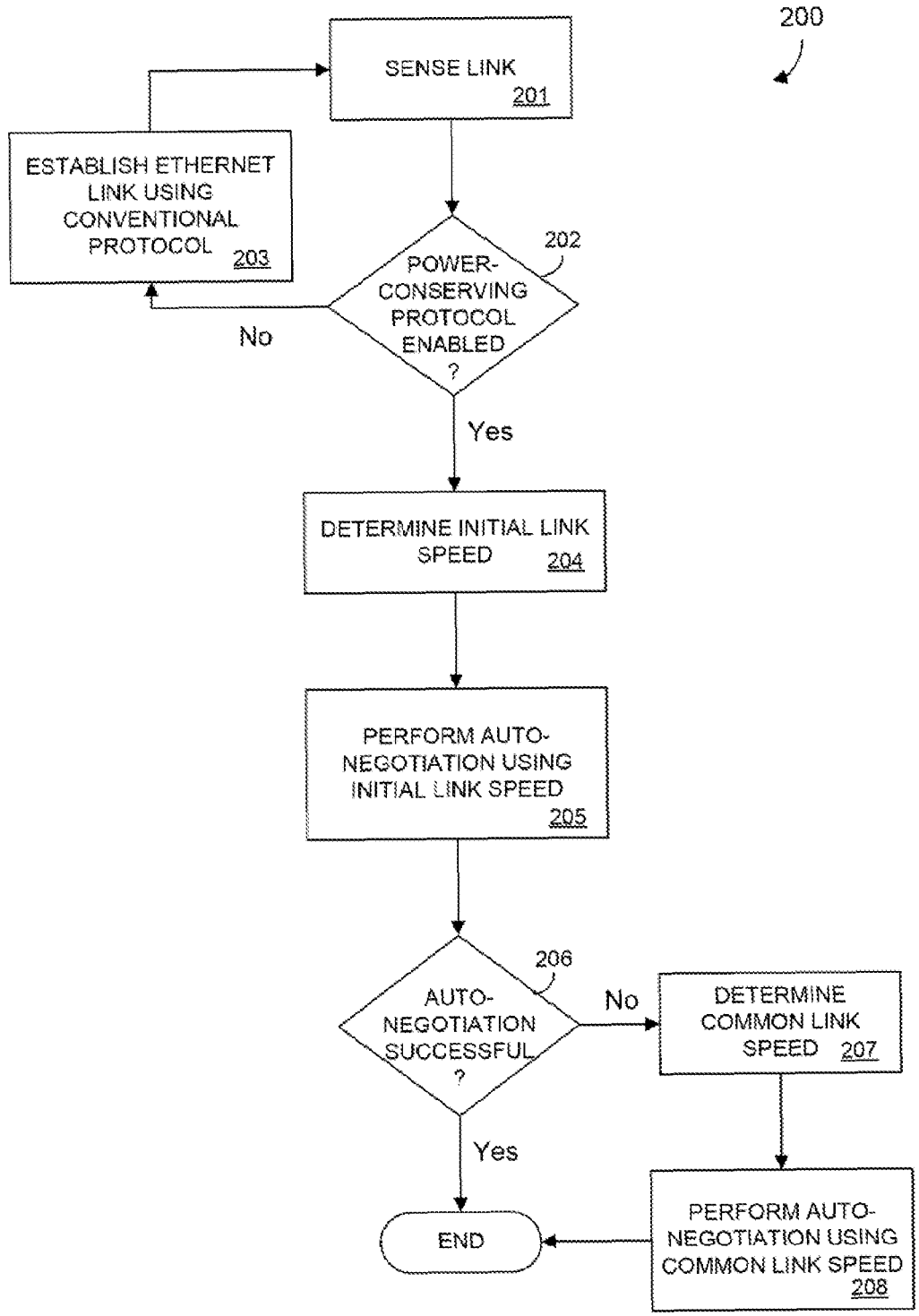
FIG. 2 is a flow diagram of process steps according to some embodiments.

FIG. 2 is a flow diagram of process steps 200 according to some embodiments. Process steps 200 may be performed by either of device 10 or device 20. Process steps 200 may be implemented by any combination of hardware, software or firmware. In some embodiments, process steps 200 are implemented by hardware of an Ethernet controller, while process steps 200 are implemented in other embodiments by a microcontroller executing locally- or remotely-stored microcontroller code. The foregoing description will assume that process steps 200 are being performed by device 10.

Prior to process steps 200, device 10 resides in a "link disconnect" state. The "link disconnect" state indicates that device 10 does not detect Ethernet-formatted signaling from any partner on link 30. The state may result from a physical disconnection of device 10 from link 30, from a transmission error, or from other situations. While in the "link disconnect" state, device 10 determines to communicate over link 30 with device 20. This determination may be based on an instruction or on other signals received by device 10.

Next, an Ethernet link is sensed in step 201 of process steps 200. Step 201 may comprise the detection of energy pulses sent by a partner connected to physical link 30. As defined by the Ethernet specification, these pulses indicate that a link partner is available to establish an Ethernet communication link. Flow proceeds to step 202 once the link is sensed.

In step 202, device 10 determines whether a power-conserving protocol is enabled. A power-conserving protocol may be enabled using any currently- or hereafter-known system for configuring a device. In a case that device 10 is an Ethernet controller, the protocol may be enabled by applying a corresponding signal to an external pin of device 10. The pin would then be sampled in step 202 to determine whether the protocol is enabled. In some embodiments, a software driver sets a configuration including a power-conserving protocol during boot-up of device 10.

Figure 3:
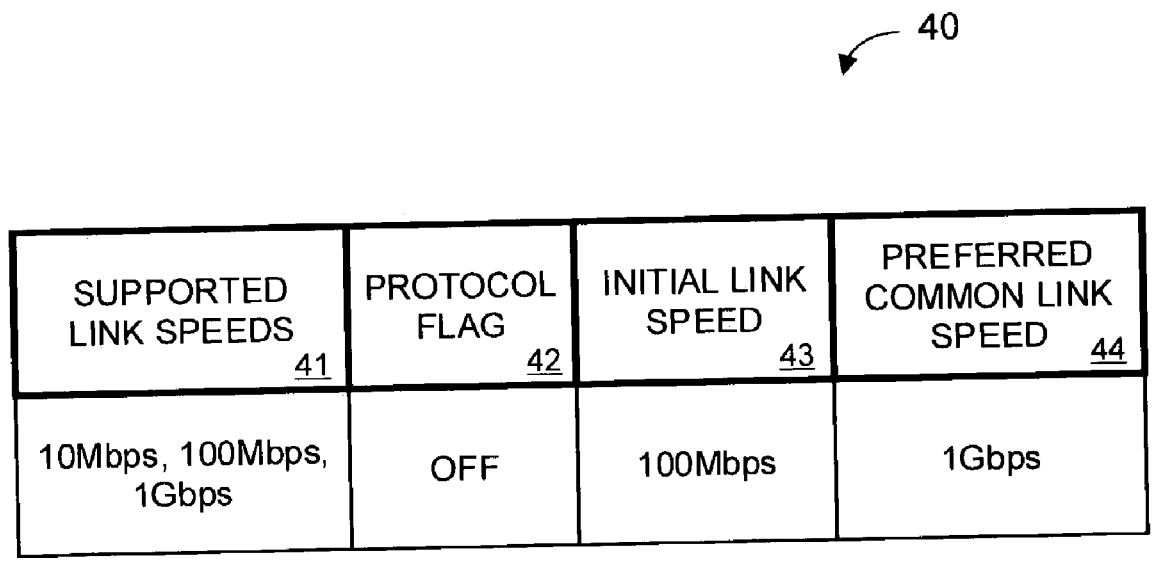
FIG. 3 is a tabular representation of configuration information used in conjunction with some embodiments.

Some embodiments store configuration information in a non-volatile programmable memory. FIG. 3 is a tabular representation of configuration information 40 for device 10 that may be stored in such a memory. Configuration information 40 may be maintained and used in conjunction with any currently- or hereafter-known system for managing configuration information. According to one system, one or more fields of configuration information 40 are hard-wired into device 10.

Configuration information 40 of the illustrated embodiment comprises several fields. Supported speeds field 41 indicates Ethernet link speeds supported by device 10, while protocol flag field 42 specifies whether a power-conserving protocol is enabled in device 10. Accordingly, protocol flag field 42 may be used in step 202 to determine whether the power-conserving protocol is enabled.

Initial link speed field 43 and preferred common link speed field 44 relate to some embodiments of the power-conserving protocol described herein. Initial link speed field 43 specifies an initial link speed at which device 10 attempts to establish an Ethernet link according to the power-conserving protocol, and preferred common link speed field 44 indicates a link speed at which device 10 attempts to establish an Ethernet link if a link cannot be established at the initial link speed. Usage of configuration information 40 will be described in more detail below.

For comparison, FIG. 4 illustrates a tabular representation of configuration information 50 of device 20 according to some embodiments. Configuration information 50 includes fields 51 through 54 that correspond to similarly-named fields of configuration information 40. As shown, device 20 supports the same link speeds as supported by device 10. However, a power-conserving protocol is not enabled within device 20 and, even if it were enabled, its initial link speed and preferred common link speed are different than those of device 10.

If it is determined that the power-conserving protocol is not enabled, an Ethernet link is established between device 10 and device 20 in step 203 using conventional Ethernet protocols. Using the specific example of FIG. 3, such a determination may be made if the value of field 42 is equal to "OFF". If the power-conserving protocol is enabled (field 42 specifies "ON"), flow continues to step 204.

Device 10 determines an initial link speed in step 204. The initial link speed may be determined based on field 43 of configuration information 40, or in any other manner. The initial link speed may be the lowest link speed supported by device 10, the last link speed used by device 10, or any other link speed. In this regard, the initial link speed may be a fixed value or a variable value that depends upon existing conditions. Configuration information 40 may therefore be periodically updated to reflect a new initial link speed, or may simply provide a pointer to a storage location from which the initial link speed may be determined.

In some embodiments, the initial link speed may be less than a second link speed that is supported by both device 10 and device 20. In contrast, an Ethernet link would be established between device 10 and device 20 at the second speed according to conventional Ethernet protocols. Since power consumption by devices 10 and 20 may be less at the initial link speed than at the second link speed, some embodiments provide power conservation.

Auto-negotiation is performed with device 20 in step 205 using conventional Ethernet protocols. Auto-negotiation was first defined in Clause 28 of the 802.3u Fast Ethernet supplement to the IEEE 802.3 standard, and Clause 28 has since evolved to include all three Ethernet speeds supported over twisted cable. More recent additions to the IEEE 802.3 standard define auto-negotiation over fiber (Clause 37) and auto-negotiation at Gigabit speeds (Clause 40.5). Generally, a device uses auto-negotiation to detect the various modes that exist in a link partner, and to advertise it own abilities so as to automatically configure the highest performance mode of interoperation. In the present example, device 10 advertises the initial link speed and does not advertise any other link speed that it supports.

If device 20 also supports the initial link speed, the auto-negotiation may be successful in establishing an Ethernet link at the initial link speed. Device 10 therefore determines that the auto-negotiation was successful in step 206 and process steps 200 thereafter terminate. Device 10 may subsequently communicate with device 20 over the established Ethernet link using Ethernet protocols.

If it is determined in step 206 that auto-negotiation was not successful, flow proceeds to step 207 to determine a common link speed. Due to the auto-negotiation protocol, device 10 will have received the link speeds supported by device 20 (and specified in field 51 of configuration information 50) by the time process steps 200 reach step 207. Device 10 therefore determines a common link speed supported by itself and by device 20 in step 207 based on the link speeds specified in field 41 of configuration information 40 and on the supported link speeds received from device 20.

In some embodiments of step 207, device 10 determines its preferred common link speed as specified in field 44 of configuration information 40. Device 10 then determines whether the preferred common link speed is supported by device 20. If so, the common link speed determined in step 207 is equal to the preferred common link speed. As described with respect to the initial link speed of device 10, the preferred common link speed may be determined based on field 44 of configuration information 40, or in any other manner. The preferred common link speed may be a next-highest (as compared to the initial link speed) link speed supported by device 10, a variable value equal to the lowest link speed supported by device 20, or any other link speed. Configuration information 40 may therefore be periodically updated to reflect a new preferred common link speed, or may simply provide a pointer to a storage location from which the preferred common link speed may be determined.

Device 10 performs auto-negotiation in step 208 using the determined common link speed. Device 10 performs the auto-negotiation in some embodiments by advertising the determined common link speed and no other link speed. Since device 20 also supports the common link speed, step 208 should establish an Ethernet link between device 10 and device 20 at the common link speed. Accordingly, process steps 200 terminate after step 208.

Figure 5:
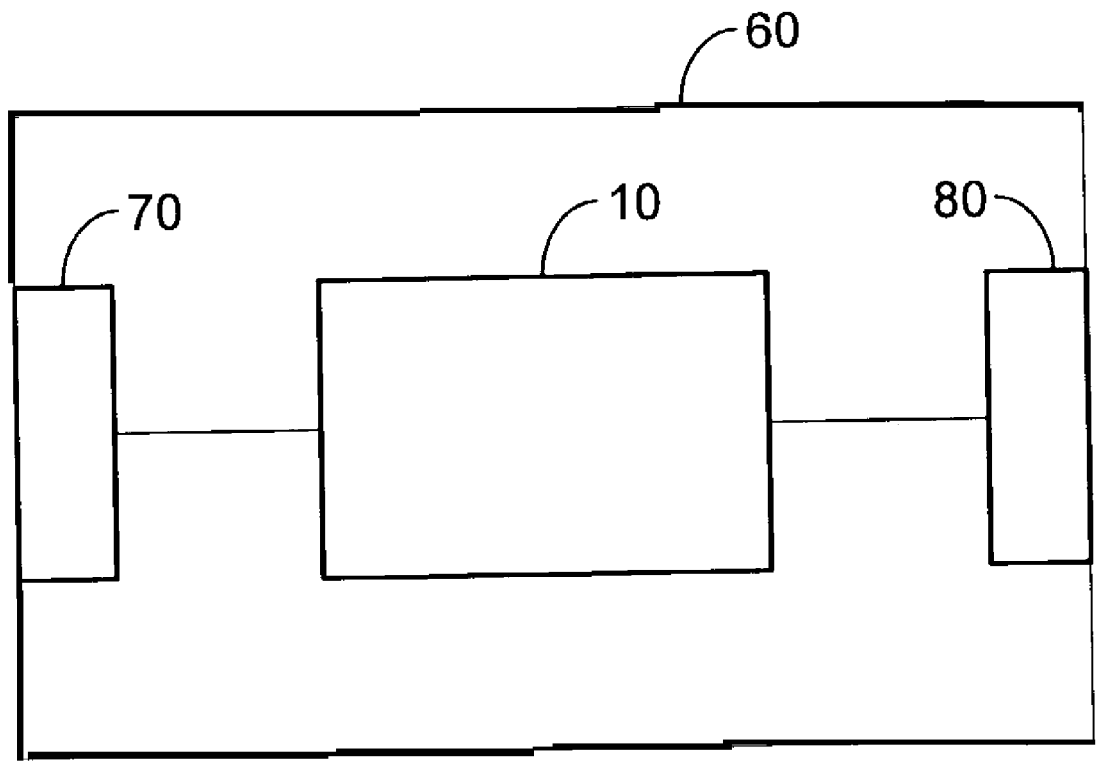
FIG. 5 is a diagram illustrating an Ethernet card according to some embodiments.

FIG. 5 is a block diagram of a system according to some embodiments. System 60 comprises an expansion card including device 10, network interface 70 and host data bus interface 80. According to the illustrated embodiment, device 10 comprises an Ethernet controller providing an Ethernet-supporting physical layer and a media access control layer to a host device. Network interface 70 is coupled to device 10 to provide data transmission to/from an Ethernet network from/to device 10. Network interface 70 may provide an interface to any one or more types of Ethernet network, including, but not limited to, a 10 Mbps, a 100 Mbps and a 1000 Mbps (gigabit) network. Device 10 is also coupled to host data bus interface 80 to allow communication with a host device via an interface such as PCI or the like.

Device 10 of FIG. 5 may comprise any implementation of an Ethernet controller. For example, device 10 may include a microcontroller for executing controller code stored in a memory that is located in device 10, card 60, or elsewhere. Device 10 may also provide an Ethernet network interface, thus obviating any need for network interface 70. Similarly, device 10 may comprise a host data bus interface providing functionality similar to host data bus interface 80.

Thus, embodiments may provide more efficient power management than conventional Ethernet protocols.

The several embodiments described herein are solely for the purpose of illustration. Embodiments may include any currently or hereafter-known elements that provide functionality similar to those described above. Therefore, persons skilled in the art will recognize from this description that other embodiments may be practiced with various modifications and alterations.

What is claimed is:
1. A method comprising:
  determining a first plurality of connection speeds associated with a first device;
  determining a second plurality of connection speeds associated with a second device;

determining a slowest common link speed of the first plurality of connection speeds and the second plurality of connection speeds;

negotiating an Ethernet link at the slowest common link speed;

actively communicating between the two devices over the Ethernet link at the slowest common link speed;

determining whether the Ethernet link was successfully negotiated at the slowest common link speed; and if the Ethernet link was not successfully negotiated, (i) determining a next-slowest common link speed of the first plurality of connection speeds and the second plurality of connection speeds, (ii) negotiating the Ethernet link at the next-slowest common link speed, and (iii) actively communicating between the two devices over the Ethernet link at the next-slowest common link speed.

2. A method according to claim 1, wherein the step of determining the next-slowest common link speed comprises:

determining a default link speed; and determining that the default speed is supported by each of two devices to communicate via the Ethernet link.

3. A method according to claim 1, further comprising:

determining whether a power-conserving protocol is enabled.

4. A system having processing elements for:

determining a first plurality of connection speeds associated with a first device;

determining a second plurality of connection speeds associated with a second device;

determining a slowest common speed of the first plurality of connection speeds and the second plurality of connection speeds;

negotiating an Ethernet link at the slowest common link speed;

actively communicating between the two devices over the Ethernet link at the slowest common link speed;

determining whether the Ethernet link was successfully negotiated at the slowest common link speed; and if the Ethernet link was not successfully negotiated, (i) determining a next-slowest common link speed of the first plurality of connection speeds and the second plurality of connection speeds, (ii) negotiating the Ethernet link at the next-slowest common link speed, and (iii) actively communicating between the two devices over the Ethernet link at the next-slowest common link speed.

5. A system according to claim 4, wherein determination of the next-slowest common link speed comprises determination of a link speed other than the slowest common link speed supported by each of two devices to communicate via the Ethernet link.

6. A system according to claim 4 wherein determination of the next-slowest common link speed comprises determination of a default link speed, and determination that the default speed is supported by each of two devices to communicate via the Ethernet link.

7. A system according to claim 4, further to determine whether a power-conserving protocol is enabled.

8. A method comprising:

sensing an Ethernet link;

determining if a power conserving protocol is enabled;

if the power conserving protocol is enabled, determining a first plurality of connection speeds associated with a first device;

determining a second plurality of connection speeds associated with a second device;

determining a slowest common link speed of the first plurality of connection speeds and the second plurality of connection speeds;

negotiating an Ethernet link at the slowest common link speed;

actively communicating between the two devices over the Ethernet link at the slowest common link speed;

determining whether the Ethernet link was successfully negotiated at the slowest common link speed; and if the Ethernet link was not succesfully negotiated (i) determining a next-slowest common link speed of the first plurality of connection speeds and the second plurality of connection speeds, (ii) negotiating the Ethernet link at the next-slowest common link speed, and (iii) actively communicating between the two devices over the Ethernet link at the next-slowest common link speed, and if the power conserving protocol is not enabled, determining a common Ethernet link speed and negotiating the Ethernet link at the common Ethernet link speed while actively communicating.

9. A method according to claim 8, wherein determining of the next-slowest link speed comprises determining of a link speed other than the slowest link speed supported by each of two devices to communicate via the Ethernet link.

* * * * *